United States Patent [19]

Ruff et al.

[11] Patent Number: 4,720,304
[45] Date of Patent: Jan. 19, 1988

[54] PIGMENT FORMULATIONS

[75] Inventors: Wolfgang Ruff, Stuttgart; Egon Liedek, Esslingen; Gerhard Berger, Stuttgart; Hans W. Sonneborn, Schwaebisch-Gmuend, all of Fed. Rep. of Germany

[73] Assignee: BASF Farben+Fasern Aktiengesellschaft, Hamburg, Fed. Rep. of Germany

[21] Appl. No.: 777,494

[22] Filed: Sep. 19, 1985

[30] Foreign Application Priority Data

Sep. 19, 1984 [DE] Fed. Rep. of Germany ....... 3434379

[51] Int. Cl.$^4$ ................................. C08K 5/18
[52] U.S. Cl. ................... 106/288 Q; 106/23; 106/309
[58] Field of Search ............ 106/309, 288 Q, 23; 534/752, 744, 776, 800, 830, 834

[56] References Cited

U.S. PATENT DOCUMENTS

| Re. 27,575 | 2/1973 | Ribka et al. | 534/887 |
|---|---|---|---|
| 3,759,731 | 9/1973 | Kuhne et al. | 106/288 Q |
| 3,877,957 | 4/1975 | Bradley et al. | 106/288 Q |

Primary Examiner—Amelia Burgess Yarbrough
Attorney, Agent, or Firm—Oblon, Fisher, Spivak, McClelland, & Maier

[57] ABSTRACT

Novel formulations which contain (a) one or more azo pigments based on coupling products of aromatic monoamines or 4,4'-diaminodiphenyls with acetoacetarylides, 1-arylpyrazolones, 3-hydroxy-2-naphthoic acid derivatives or β-naphthol and (b) one or more dyes of the formula

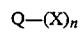

where F is an n-valent radical of a monoazo dye, of a disazo dye or of a quinophthalone, n is 1, 2, 3 or 4 and X is a group of the formula

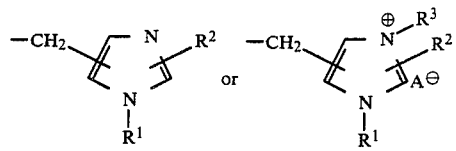

where $R^1$ and $R^2$ are each hydrogen or $C_1$–$C_4$-alkyl, $R^3$ is $C_1$–$C_4$-alkyl or hydroxy-$C_2$–$C_4$-alkyl and $A^\ominus$ is one equivalent of an anion.

The pigments present in the formulations exhibit improved tinctorial, rheological and printing properties when the formulations are used in printing inks.

17 Claims, No Drawings

PIGMENT FORMULATIONS

BACKGROUND OF THE INVENTION

1. Field of the Invention

It is known that the dyeing properties of pigments in various binders can be improved by admixing dyes containing acid groups.

2. Discussion of the Background

For example, German Published Application DAS No. 2,012,153 discloses pigment mixtures which consist of two or more dyes and in which some of the dyes contain polar groups, such as carboxyl, sulfo, carbamyl or sulfamyl groups. The amount of these acidic dyes can be from 0.5 to 20, preferably from 1 to 5, mol %.

German Published Application DAS No. 2,135,468 discloses pigment formulations consisting of coupling products of diazotized anilines and acetoacetylamides, which contain a water-soluble dye based on the coupling product. The amount of the soluble dye can be from 0.1 to 20% by weight, based on the formulation.

German Published Application DAS No. 2,012,152 describes a process for the preparation of diazo pigment mixtures, in which tetrazotized 3,3'-dichloro-4,4'-diaminodiphenyl is coupled with a mixture in a molar ratio of 1:2, the mixture containing one or two different non-polar coupling components of the acetoacetarylide or 1-arylpyrazol-5-one series and one or two different polar coupling components from these series. The polar components carry one or two carboxyl and/or sulfo groups. The amount of the polar coupling components is from 0.5 to 20, preferably from 1 to 5, mol %.

German Published Application DAS No. 2,122,521 discloses modified diarylide pigments which contain not only the pigment based on 4,4'-diaminodiphenyl with acetoacetarylide, 1-phenyl-3-methylpyrazol-5-one or 2-hydroxynaphthalene-3-carboxanilide, but also up to 25% by weight of a water-soluble dye based on the same compounds.

Furthermore, EP-B No. 12 944 describes monoazo pigment mixtures which are obtained by coupling diazotized anilines to acetoacetarylamides, more than one diazo and/or coupling component being used, and from 0.1 to 20 mol % of the diazo and/or coupling components containing acidic groups and the reactive acidic groups in the coupling product being reacted with quaternary cationic compounds.

SUMMARY OF THE INVENTION

It is an object of the present invention to provide further pigments or pigment formulations which are suitable for printing inks and which possess improved tinctorial, rheological and printing properties.

We have found that this object is achieved, and that pigments possessing improved performance characteristics are obtained, if the pigments are present in the form of formulations which contain (a) one or more azo pigments ($\alpha$) based on coupling products of diazotized aromatic monoamines with acetoacetarylides, 1-phenylpyrazolones, 3-hydroxy-2-naphthoic acid, its arylides and/or $\beta$-naphthol, (or $\beta$) based on coupling products of tetrazotized 4,4'-diaminodiphenyl, dichloro-, dichlorodibromo- and/or tetrachloro-4,4'-diaminodiphenyl with acetoacetarylides and/or 1-phenylpyrazolones, or $\gamma$) mixtures of these pigments, and (b) one or more dyes of the general formula

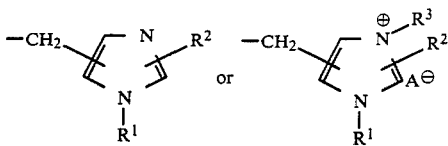

where Q is an n-valent radical of a monoazo dye, a disazo dye or a quinophthalone, and may or may not carry a sulfo group, n is 1, 2, 3 or 4 and X is a group of the formula $$-CH_2 \diagdown \diagup N \diagdown R^2 \quad \text{or} \quad -CH_2 \diagdown \diagup \overset{\oplus}{N} \diagdown R^2 \; A^{\ominus}$$
$$\phantom{xxxxxx} N \phantom{xxxxxxxxxxxxxx} N$$
$$\phantom{xxxxxx} | \phantom{xxxxxxxxxxxxxxx} |$$
$$\phantom{xxxxxx} R^1 \phantom{xxxxxxxxxxxxxx} R^1$$

where $R^1$ and $R^2$ independently of one another are each hydrogen or $C_1$–$C_4$-alkyl, $R^3$ is $C_1$–$C_4$-alkyl or hydroxy-$C_2$–$C_4$-alkyl and $A^{\ominus}$ is one equivalent of an anion, and, where n is $>1$, the radicals X may be identical or different, and, if required, (c) other components conventionally employed in pigment formulations.

DETAILED DESCRIPTION OF THE PREFERRED EMBODIMENTS

Compared with the pure pigments, the pigments of the formulations according to the invention possess substantially better tinctorial, rheological and printing properties. In liquid printing ink systems, eg. in the case of gravure printing inks, good flow behavior is of great importance with regard to printing properties. However, in the case of the prior art pigment formulations, advantageous rheological behavior is, as a rule, achieved at the expense of lower transparency of the prints obtained with these inks, while conversely, increasing the transparency frequently results in poorer flow behavior. For example, a formulation of C.I. Pigment Yellow 13 (C.I. No. 21,100) containing 4% by weight of the dye described in EP-A No. 34 725, Example 72, gives a nitrocellulose gravure printing ink which has a substantially improved viscosity compared with an ink which contains the pure Pigment Yellow 13. Moreover, the gravure printing ink containing the formulation according to the invention gives prints which possess substantially better gloss and better transparency.

The formulations according to the invention have the advantage of combining good flow behavior of the printing ink with high transparency of the prints obtained with these inks.

In comparison, for example, the formulation which contains not only C.I. Pigment Yellow 13 but also an acidic dye obtainable by coupling 3,3'-diaminodiphenyl-2,2'-disulfonic acid with acetoacet-2,4-dimethylanilide gives a nitrocellulose-based gravure printing ink which, although producing prints having high transparency and good gloss, possesses poor flow behavior.

The pigments (a) present in the novel formulations are known. These pigments are coupling products which are obtained: ($\alpha$) from diazotized aromatic monoamines, in particular substituted anilines, with acetoacetarylides, with phenylpyrazolones which may be further substituted in the pyrazolone radical and/or in the phenyl radical, with 3-hydroxy-2-naphthoic acid, its arylides, $\beta$-naphthol or $\beta$ mixtures of these, (or $\beta$) from tetrazotized 4,4'-diaminodiphenyls, such as 4,4'-diaminodiphenyl, 3,3'-dichloro-4,4'-diaminodiphenyl, dichlorodibromo- and/or tetrachloro-4,4'-diaminodiphenyl with acetoacetarylides and/or 1-phenylpyrazolones, which may be further substituted.

Specific examples are: C.I. Pigment Yellow 13 (C.I. No. 21,100); C.I. Pigment Yellow 12 (C.I. No. 21,090); C.I. Pigment Yellow 14 (C.I. No. 21,095); C.I. Yellow 83 (C.I. No. 21,108); C.I. Pigment Yellow 1 (C.I. No. 11,680); C.I. Pigment Yellow 74 (C.I. No. 11,741); C.I. Pigment Yellow 73 (C.I. No. 11,730); C.I. Pigment Orange 13 (C.I. No. 21,110); C.I. Pigment Orange 34 (C.I. No. 21,115) and C.I. Pigment Red 3 (C.I. No. 12,120).

Other suitable components (a) are pigment mixtures which are obtained by coupling two different diazo components to one or more coupling components, or by coupling a diazo component to two or more coupling components.

Components (a) are preferably disazo pigments based on diazotized 3,3'-dichloro-4,4'-diaminodiphenyl with acetoacetarylides, phenylpyrazol-5-one compounds or mixtures of these coupling components.

In these cases, one of the components is as a rule present in the product in an amount of not less than 80–98%.

Suitable additives (b) are dyes of the formula $$Q(X)_n \quad (I)$$

where Q is an unsubstituted or sulfo-substituted, n-valent radical of a monoazo dye, of a disazo dye or of a quinophthalone, n is 1, 2, 3 or 4, preferably 1 or 2, and X is a group of the formula

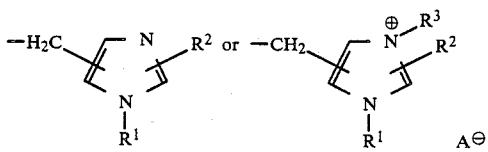

(IIa)

where $R^1$ and $R^2$ independently of one another are each hydrogen or $C_1-C_4$-alkyl, $R^3$ is $C_1-C_4$-alkyl or hydroxy-$C_2-C_4$-alkyl and $A^\ominus$ is one equivalent of an anion, and, where n is >1, the radicals X may be identical or different. For tinctorial reasons, preferred dyes are those whose hues correspond to or approach those of the pigments used as (a).

Dyes (I) which are suitable as additives (b) are disclosed in EP-A-34 725.

Noteworthy dyes (I) are those in which Q is an n-valent radical which is derived from benzoquinophthalone or from a dye of the formula (III) or (IV)

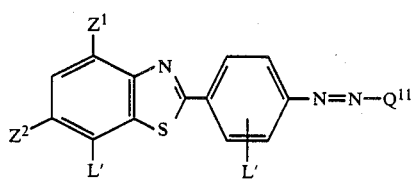

(III)

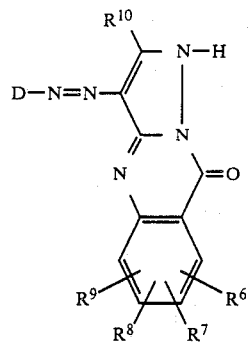

(IV)

In formula (III), $Q^{11}$ is a radical of the formula (Va), (Vb), (Vc), (Vd), (Ve) or (Vf)

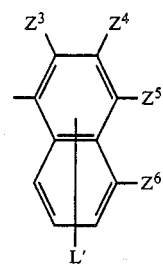

(Va)

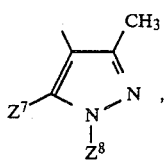

(Vb)

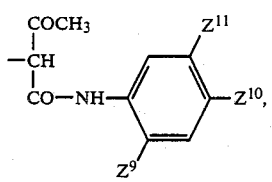

(Vc)

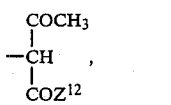

(Vd)

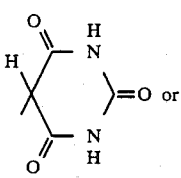

(Ve)

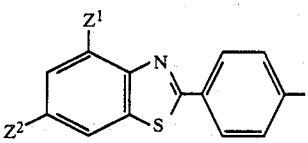

(Vf)

and $Z^1$ is hydrogen or methyl, $Z^2$ is hydrogen, methyl or ethyl, $L'$ is sulfo or hydrogen, $Z^3$ is hydrogen, hydroxyl, amino, 2-hydroxyethylamino, methylamino or phenylamino, $Z^4$ is hydrogen, acetyl or N-phenylcarbamyl, $Z^5$ is hydrogen, hydroxyl, methyl, methoxyl, chlorine, bromine, 2-hydroxyethylamino or dimethylamino, $Z^3$ or $Z^5$ being hydroxyl or unsubstituted or substituted amino, $Z^6$ is hydrogen, methyl or methoxy, $Z^7$ is hydroxyl or amino, $Z^8$ is phenyl or 4-methoxyphenyl, $Z^9$ and $Z^{10}$ are each hydrogen, methyl or methoxy, $Z^{11}$ is hydrogen or methoxy and $Z^{12}$ is methoxy, butoxy, amino, methylamino, phenoxy, 4-methylphenoxy or 3-methyl-4-methoxyphenoxy.

In formula IV, D is phenyl which is unsubstituted or substituted by phenylazo or tolylazo and substituted by one or two chlorine atoms, nitro groups, methoxy groups and/or methyl groups, or is a radical of the formula (Vf), where $Z^1$ and $Z^2$ have the above meanings, $R^6$ is hydrogen, chlorine, bromine, nitro, methyl, trifluoromethyl, carboalkoxy, unsubstituted or substituted carbamyl or sulfamyl, an arylsulfonate group, cyano, alkanoylamino or phenyl, $R^7$ is hydrogen, chlorine or bromine, $R^8$ and $R^9$ independently of one another are each hydrogen, chlorine or bromine, or together form a fused ring, and $R^{10}$ is methyl or is phenyl which is unsubstituted or substituted by chlorine or methoxy.

Further examples of dyes (I) are those which are derived from disazo dyes based on coupling products of 4,4'-diaminodiphenyls with acetoacetanilides, phenylpyrazolones, naphthols or 3-hydroxy-2-naphthoic acid arylides. Among these dyes, preferred ones are those which contain 3,3'-dichloro-, dichlorodibromo- and/or tetrachloro-4,4'-diaminodiphenyl as the azo component and acetoacetanilides and/or phenylpyrazolones as the coupling component.

Particularly noteworthy dyes (I) are those in which Q is a monovalent or divalent radical which is derived from 5,6-benzoquinophthalone or from a dye of the formula (IIIa) or (IVa):

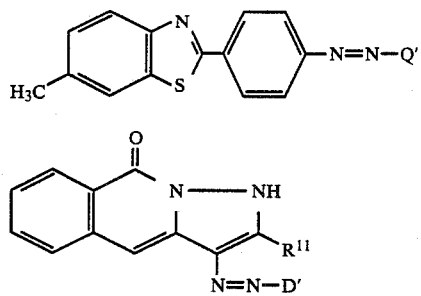

(IIIa)

(IVa)

where Q' is a radical of barbituric acid, of N-methyl-N-benzylaniline or of 4-(6'-methylbenzothiazol-2'-yl)-phenyl, $R^{11}$ is methyl or phenyl and D' is a radical of a phenylazo-substituted or tolylazo-substituted phenyl radical which may be further substituted by chlorine, methoxy or methyl, or of 4-(6'-methylbenzothiazol-2'-yl)-phenyl.

Quinophthalone compounds of the formula

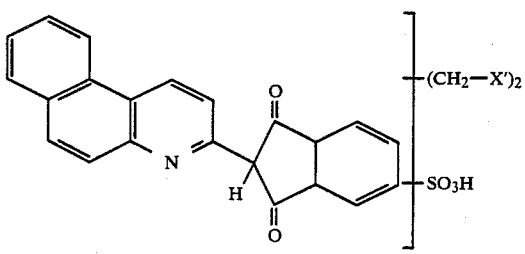

(VI)

where X' is

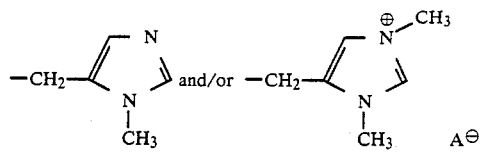

are very particularly preferred.

The amount of (b) in the novel formulations is as a rule from 0.2 to 10% by weight and depends on the pigment (a) and its use. The amount of (b) required for optimum properties of the pigment can readily be determined by simple series experiments. In general, it is sufficient to add from 1 to 5, in particular from 1.5 to 4, % by weight, based on (a), of (b) in order to impart to the pigment optimum properties for printing inks, in particular for gravure printing inks.

The novel formulations according to the invention can be prepared in various ways.

For example, coupling to the pigment (a) can be carried out in the presence of the dye (b). The dye (b) can be added to the coupling component or to the diazo component prior to coupling. (b) may furthermore be added separately during the coupling reaction, in the form of a suspension or solution.

In the preferred procedure, (b) is added to the aqueous pigment suspension when the coupling reaction is complete, or to the presscake of (a) which has been washed neutral and suspended in water.

In some cases, it is also possible to add (b) during the dispersing of (a) in a binder solution. Furthermore, it is also possible in some cases to mix (a) and (b) in a dry state and to mill the mixture.

The pigments present in the novel formulations can be further improved in some cases if, in addition, resins eg. rosin or rosin derivatives (modified rosin), such as hydrogenated, dehydrogenated, disproportionated or polymerized rosin, tall oils and/or other agents which are known dispersants, eg. fatty alcohols, polyols, esters of long-chain mono- or polycarboxylic acids, such as diethyl, dipropyl, diisopropyl, dibutyl, dihexyl and dioctyl sebacate, are added to the mixture of (a) and (b).

Advantageously, (b) is added in the form of an aqueous suspension or solution to the aqueous neutralized pigment suspension, the pigment properties being changed advantageously by subsequent heating. The formulation is then isolated in a conventional manner, if necessary after cooling.

Where resins are added, it is advantageous to employ the following procedure: first, the dye (b), in the form of a solution or suspension, is added to the neutral or slightly alkaline pigment suspension, and then an aqueous alkaline solution of the resin and, if required, an aqueous dispersion of a dispersant are added. The mixture is heated at from 50° C. to the boiling point, and the resin is precipitated either in the form of the acid or by adding metal salts, which give insoluble resin soaps.

The formulation is then isolated in a conventional manner.

The Examples which follow illustrate the novel formulations and their preparations. Parts and percentages are by weight. Parts by volume bear the same relation to parts by weight as that of the liter to the kilogram.

EXAMPLE 1

(A) Formulation (A1) Tetrazotization 14 parts of 3,3'-dichloro-4,4'-diaminodiphenyl in 830 parts of 0.4N hydrochloric acid were tetrazotized at 0° C. with 7.7 parts of sodium nitrite. Excess sodium nitrite was removed with amidosulfonic acid.

(A2) Coupling 23.2 parts of acetoacet-2,4-dimethylanilide were dissolved in 159 parts of 1.5N sodium hydroxide solution. 151 parts of 0.5N acetic acid were initially taken in the coupling vessel. The alkaline solution of the coupling component was then added to the acetic acid in an amount such that a pH of 4.5 was reached. Thereafter, the tetrazo solution (A1) and the remaining solution of the coupling component were added at the same time to the reaction vessel, the pH being kept at 4.5 (if necessary by adding dilute sodium hydroxide solution) and the temperature at 20° C.

When coupling was complete, 2 parts of the dye described in EP-A-34 275, Example 71, in the form of an aqueous suspension (prepared by reacting 4-methylimidazole, paraformaldehyde and 2-[1,3-dioxohydrin-2-yl]-5,6-benzoquinoline) were added to the pigment suspension. Thereafter, the mixture was boiled for 30 minutes, the precipitate was filtered-off and washed thoroughly with water, and the residue was dried at from 50° to 60° C.

(B) Comparison

Tetrazotization, coupling and after-treatment of the comparison were carried out as described under (A1) and (A2) but a dye was not added.

(C) Testing the Novel Formulation (A) and the Comparison (C1) Dispersing

A commercial nitrocellulose lacquer based on ethyl acetate/ethanol was pigmented to give an 8% strength formulation. To do this, 56 g of pigment were dispersed in 644 g of binder solution on a Dispermat AS2 after 1050 g of glass beads (diameter 3 mm) had been added. Dispersing was carried out in a 2 l vessel having a cooling jacket, at from 20° to 60° C. Stirring was carried out for 30 minutes.

(C2) Testing the Flow Behavior

The efflux times of the inks from a DIN cup were measured at various dilutions. This test was repeated after the inks had been stored for three weeks. The measurements were evaluated graphically by plotting the efflux times against the dilution to obtain flow curves.

(C3) Testing the Tinctorial Properties

Some of the inks obtained as described in (C1) were diluted by adding 0.3 part of a 1:1 ethanol/ethyl acetate mixture and applied onto paper and onto polyethylene film or metal foil by means of a handcoater or handproofer.

(C4) Assessment

The flow curve showed that the ink (C1) pigmented with the formulation from (A2) exhibited substantially more advantageous flow than the comparison pigment (B). Even after the ink (C1) had been stored for three weeks, the ink pigmented with (A2) retained its advantageous flow behavior.

The coatings prepared using the novel formulations exhibited substantially higher transparency and better gloss than the colorations obtained using the comparison B.

EXAMPLE 2

Tetrazotization of 14 parts of 3,3'-dichloro-4,4'-diaminodiphenyl and coupling of the product to 23.2 parts of acetoacet-2,4-dimethylanilide were carried out as described in Example 1. When coupling was complete, 2 parts of the dye described in EP-A-34 725, Example 72 (prepared by reacting 1-methylimidazole, paraformaldehyde and 2-[1,3-dioxohydrin-2-yl]-5,6-benzoquinoline), were added, in the form of an aqueous suspension, to the pigment suspension. Thereafter, the mixture was boiled for 30 minutes and the formulation was filtered-off, washed with water and dried at from 50° to 60° C.

The formulation was dispersed in a nitrocellulose gravure printing binder, as described in Example 1 (C1). Compared with a pigment prepared without the addition of a dye, the advantages of the colorations in terms of gloss, transparency and rheological behavior were similar to those in the case of the pigment formulation obtained according to Example (1A).

EXAMPLE 3

Tetrazotization of 14 parts of 3,3'-dichloro-4,4'-diaminodiphenyl and coupling of the product to 23.2 parts of acetoacet-2,4-dimethylanilide were carried out as stated in Example (1A). When coupling was complete, 2 parts of an aqueous solution of a dye of the formula

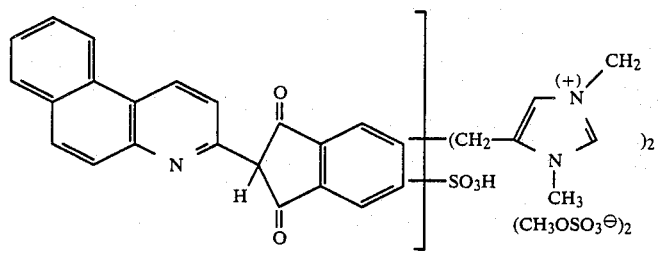

(obtained by quaternization of the dye used in Example 2 with dimethylsulfate) were added to the pigment suspension. Thereafter, the mixture was heated at the boil for 30 minutes, and the formulation was filtered-off, washed with water and dried at from 50° to 60° C.

The formulation was dispersed in a nitrocellulose gravure printing binder, as described in Example 1 (C1). Compared with an ink which contains a pigment prepared without the addition of a dye, the colorations obtained using the formulation exhibited superior gloss and superior transparency. The printing ink obtained using the formulation showed superior rheological behavior.

EXAMPLE 4

Tetrazotization of 14 parts of 3,3'-dichloro-4,4'-diaminodiphenyl and coupling of the product to 23.2 parts of acetoacet-2,4-dimethylanilide were carried out as stated in Example 1(A). When coupling was complete, the pigment suspension was neutralized with 10% strength sodium hydroxide solution. Thereafter, 2 parts of the dye added in Example 1 were introduced in the form of an aqueous suspension, after which 7 parts of a partially hydrogenated rosin (trade name: Staybelite Resin) in 85 parts of 0.3N sodium hydroxide solution and 1.88 parts of dibutyl sebacate, dispersed in 10 parts of water, were added in succession. The pigment suspension was heated at the boil for 15 minutes, after which the resin was precipitated at pH 5 by the addition of 10% strength hydrochloric acid, and heated at the boil for a further 15 minutes. The formulation was filtered-off, washed with water and dried at from 50° to 60° C.

The formulation was dispersed in a nitrocellulose gravure printing binder, as described in Example 1 (C1). Comparison with a pigment prepared without the addition of a dye indicated similar advantages in terms of gloss, transparency and rheological behavior to those found in the case of the formulation obtained as described in Example (1A).

EXAMPLE 5

The synthesis and after-treatment were carried out as described in Example 4, except that, instead of the dye stated in Example 1 (A2), 2 parts of the dye stated in Example 2 were added in the form of an aqueous suspension.

The formulation was dispersed in a nitrocellulose gravure printing binder, as described in Example 1 (C1). Comparison with a pigment prepared without the addition of a dye indicated similar advantages in terms of gloss, transparency and rheological behavior to those found in the case of the novel formulation obtained as described in Example (1A).

EXAMPLE 6

The synthesis and after-treatment were carried out as described in Example 4, except that 1.7 parts of the dye used in Example 3 were employed, in the form of an aqueous solution.

The resulting formulation was dispersed in a nitrocellulose gravure printing binder, as described in Example 1 (C1). Compared with an ink containing the comparison pigment, which was prepared without dye (b), the resulting ink showed similar advantages to the formulation of Example 1A1) in terms of gloss, transparency and rheological behavior.

EXAMPLE 7

(A) Pigment Formulation

Tetrazotization of 14 parts of 3,3'-dichloro-4,4'-diaminodiphenyl and coupling of the product to 23.2 parts of acetoacet-2,4-dimethylanilide were carried out as described in Example 1(A). When coupling was complete, the pigment suspension was neutralized with 10% strength sodium hydroxide solution. Thereafter, 2 parts of the dye used in Example 3, in the form of an aqueous suspension, followed by 6.7 parts of a partially hydrogenated rosin (trade name: Staybelite Resin) in 81 parts of 0.3N sodium hydroxide solution, were added. The pigment suspension was heated at the boil for 15 minutes, after which the resin was precipitated at pH 5 by adding 10% strength hydrochloric acid, and heated to the boil for a further 15 minutes. The formulation was filtered-off, washed with water and dried at from 50° to 60° C.

(B) Comparison Pigment

Coupling and after-treatment of the comparison pigment were carried out as for the pigment according to the invention, except that no dye was added after the coupling.

(C) Testing Pigment Formulation (A) and Comparison Pigment (B)

Formulation (A) and comparison pigment (B) were dispersed in a letter press/offset printing varnish at 40° C. on a three-roll mill, the pigment content in each case being 15%. Prints obtained on a Dürner test press using the ink prepared with the novel formulation showed substantially higher transparency and better gloss compared with prints produced using the ink containing (B). When the rheological properties were tested using a Laray viscometer, it was found that, in spite of the increase in transparency, the pigment according to the invention did not exhibit any deterioration in rheological properties. After exposure to heat for 2 hours at 100° C., the ink pigmented with the comparison pigment (B) showed a substantial decrease in transparency, whereas the ink pigmented with the formulation according to the invention exhibited only a slight decrease in transparency.

EXAMPLE 8

Tetrazotization of 14 parts of 3,3'-dichloro-4,4'-diaminodiphenyl and coupling of the product to 23.2 parts of acetoacet-2,4-dimethylanilide were carried out as described in Example 1(A). When coupling was complete, 2 parts of the dye of the formula

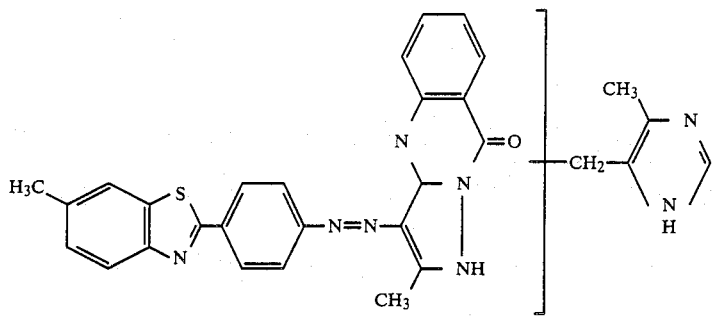

in the form of an aqueous solution were added to the pigment suspension. Thereafter, the mixture was heated at the boil for 30 minutes, and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 9

1. Tetrazotization 14 parts of 3,3'-dichloro-4,4'-diaminodiphenyl were tetrazotized as described in Example 1.

2. Coupling 20.2 parts of acetoacetanilide were dissolved in 160 parts of 1.5N sodium hydroxide solution. 150 parts of 0.5N acetic acid were initially taken in the coupling vessel, and coupling was then carried out as described in Example 1(A2).

When coupling was complete, the pigment suspension was neutralized with 10% strength sodium hydroxide solution. Thereafter, 1.83 parts of the dye added in Example 3, in the form of an aqueous solution, and 6.15 parts of a partially hydrogenated rosin (Staybelite Resin) in 71 parts of 0.3N sodium hydroxide solution were introduced in succession.

The pigment suspensio was heated at the boil for 15 minutes, after which the resin was precipitated at pH 5 by adding 10% strength hydrochloric acid, and then heated at the boil for a further 15 minutes. The formulation was filtered-off, washed with water and dried at from 50° to 60° C.

The formulation was dispersed in a letterpress/offset printing varnish, as described in Example 7(C). Comparison with a pigment (comparison) prepared without the addition of a dye indicated similar advantages in terms of gloss and transparency to those found in the case of the novel formulation described in Example 7(A). The ink prepared from the formulation obtained as described above possessed advantages in terms of thermal stability over the ink containing the comparison pigment which were similar to the advantages obtained in the case of the formulation prepared according to Example 7(A).

EXAMPLE 10

1. Tetrazotization 14 parts of 3,3'-dichloro-4,4'-diaminodiphenyl were tetrazotized as described in Example 1(A1).

2. Coupling 21.62 parts of acetoacet-2-methylanilide were dissolved in 160 parts of 1.5N sodium hydroxide solution. 150 parts of 0.5N acetic acid were initially taken in the coupling vessel, and coupling was carried out as described in Example 1(A2). When coupling was complete, 1.91 parts by weight of the dye added in Example 2, in the form of an aqueous suspension, were added to the pigment suspension. Thereafter, the mixture was boiled for 30 minutes and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 11

The synthesis and after-treatment of the pigment 3,3'-dichloro-4,4'-diaminodiphenyl→acetoacet-2-methylanilide were carried out as described in Example 10, except that, instead of the dye stated there, 1.91 parts by weight of the dye stated in Example 1 were used, in the form of an aqueous suspension.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 12

The synthesis and after-treatment of the pigment were carried out as described in Example 10, except that, instead of the dye stated there, 1.91 parts by weight of the dye of the formula

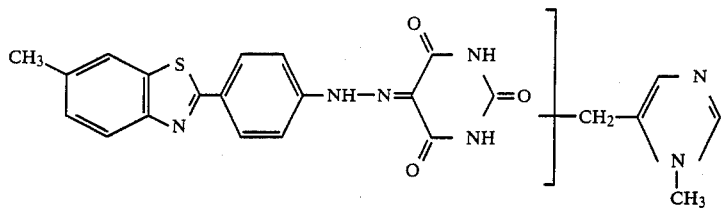

were added, in the form of an aqueous solution. (The dye was prepared by a method similar to that described in EP-A-34 725, Example 64).

The formulation was dispersed in a nitrocellulose gravure printing binder, as described in Example 1(C1). Comparison with a pigment (comparison) prepared without the addition of a dye indicated similar advantages in terms of gloss and transparency to those found in the case of the formulation obtained as described in Example 1(A). The rheological properties corresponded to those of the comparison pigment.

EXAMPLE 13

1. Tetrazotization 14 parts of 3,3'-dichloro-4,4'-diaminodiphenyl were tetrazotized as described in Example 1(A1).

2. Coupling 32.2 parts of acetoacet-2,5-dimethoxy-4-chloroanilide were dissolved in 160 parts of 1.5N sodium hydroxide solution. 150 parts of 0.5N acetic acid were initially taken in the coupling vessel, and coupling was carried out as described in Example 1(A2). When coupling was complete, 2.4 parts of the dye stated in Example 1(A2), in the form of an aqueous suspension, were added to the formulation suspension. Thereafter, the mixture was boiled for 30 minutes, and the formulation was then filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of rheological behavior to those found in the case of the novel formulation obtained as described in Example 1(A). At the same time, the prints obtained with the ink were also found to have advantages in terms of gloss and transparency.

EXAMPLE 14

The tetrazotization of 14 parts of 3,3'-dichloro-4,4'-diaminodiphenyl and coupling of the product to 32.2 parts of acetoacet-2,5-dimethoxy-4-chloroanilide were carried out as described in Example 13. When coupling was complete, 2.4 parts of the dye described in EP-A-34 725, Example 72, in the form of an aqueous suspension, were added to the pigment suspension.

Thereafter, the mixture was boiled for 30 minutes, and the fomulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of rheological behavior to those found in the case of the novel formulation obtained as described in Example 1(A). At the same time, advantages in terms of gloss and transparency were also found.

EXAMPLE 15

The tetrazotization of 14 parts of 3,3'-dichloro-4,4'-diaminodiphenyl and coupling of the product to 32.2 parts of acetoacet-2,5-dimethoxy-4-chloroanilide were carried out as described in Example 13. When coupling was complete, 2.4 parts of the dye stated in Example 3, in the form of an aqueous solution, were added to the pigment suspension. Thereafter, the mixture was boiled for 30 minutes and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of rheological behavior to those found in the case of the novel formulation obtained as described in Example 1(A). At the same time, advantages in terms of gloss and transparency were also found.

EXAMPLE 16

The tetrazotization of 14 parts of 3,3'-dichloro-4,4'-diaminodiphenyl and coupling of the product to 32.2 parts of acetoacet-2,5-dimethoxy-4-chloroanilide were carried out as described in Example 13. When coupling was complete, 2.4 parts by weight of the dye stated in Example 1(A2), in the form of an aqueous suspension, 8.4 parts of a partially hydrogenated rosin (Staybelite Resin) in 100 parts of 0.3N sodium hydroxide solution and a dispersion of 2.24 parts of dibutyl sebacate in 10 parts by volume of water were added to the pigment suspension. Thereafter, the mixture was boiled for 30 minutes, and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of rheological behavior to those found in the case of the novel formulation obtained as described in Example 1(A). At the same time, advantages in terms of gloss and transparency were also found.

A formulation having virtually the same properties is obtained when butyl sebacate is replaced with the ethyl or octyl ester.

EXAMPLE 17

1. Tetrazotization 14 parts of 3,3'-dichloro-4,4'-diaminodiphenyl were tetrazotized as described in Example 1(A1).

2. Coupling 22 parts of acetoacet-2,4-dimethylanilide and 1.2 parts of acetoacet-2-methoxyanilide were dissolved in 160 parts of 1.5N sodium hydroxide solution. 150 parts of 0.5N acetic acid were initially taken in the coupling vessel, and coupling was carried out under the conditions stated in Example 1(A2). When coupling was complete, 2 parts of the dye stated in Example 3, in the form of an aqueous solution, were added to the pigment suspension. Thereafter, the mixture was boiled for 30 minutes, and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the novel formulation obtained as described in Example 1(A).

EXAMPLE 18

The synthesis of the pigment 3,3'-dichloro-4,4'-diaminodiphenyl→acetoacet-2,4-dimethylanilide/acetoacet-2-methoxyanilide was carried out as described in Example 17.

When coupling was complete, the pigment suspension was neutralized with 10% strength sodium hydroxide solution. Thereafter, 2 parts of the dye stated in Example 2, in the form of an aqueous solution, followed by 7 parts of a partially hydrogenated rosin (Staybelite Resin) in 86 parts of 0.3N sodium hydroxide solution and a dispersion of 1.88 parts of dibutyl sebacate in 10 parts by volume of water, were added. The pigment suspension was boiled for 15 minutes, after which the resin was precipitated at pH 5 by adding 10% strength hydrochloric acid, and heated at the boil for a further 15 minutes. The formulation was filtered-off, washed with water and dried at from 50° to 60° C.

The formulation was dispersed in a nitrocellulose gravure pritning binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 19

Tetrazotization of 14 parts of 3,3'-dichloro-4,4'-diaminodiphenyl and coupling of the product to 23.2 parts of acetoacet-2,4-dimethylanilide were carried out as described in Example 1(A). When coupling was complete, the pigment suspension was neutralized by adding 10% strength sodium hydroxide solution.

Thereafter, 2 parts of the dye stated in Example 3, in the form of an aqueous solution, were added, after which 2.08 parts of partially hydrogenated rosin (Staybelite Resin), dissolved in 25 parts of 0.3N sodium hydroxide solution, and a dispersion of 1.68 parts of dibutyl sebacate in 10 parts of water were introduced in succession. The suspension was boiled for 15 minutes, after which the resin was precipitated by adding 0.46 part of calcium chloride, and the mixture was heated at the boil for a further 15 minutes. The suspension was cooled to 80° C., its pH was brought to 8, and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 20

1. Tetrazotization 13.72 parts of 3,3'-dichloro-4,4'-diaminodiphenyl and 0.28 part of 3,3'-dimethoxy-4,4'-diaminodiphenyl in 835 parts of 0.4N hydrochloric acid were tetrazotized at 0° C. with 7.7 parts of sodium nitrite. Excess sodium nitrite was removed with amidosulfonic acid.

2. Coupling 20.2 parts of acetoanilide were dissolved in 160 parts by volume of 1.5N sodium hydroxide solution. 150 parts of 0.5N acetic acid were initially taken in the coupling vessel. Coupling was carried out as described in Example 1(A2), and the resulting pigment suspension was neutralized with 10% strength sodium hydroxide solution. Thereafter, 1.83 parts of the dye stated in Example 3, in the form of an aqueous solution, and 15.7 parts of a partially hydrogenated rosin (Staybelite Resin) in 180 parts of 0.3N sodium hydroxide solution were added in succession. The suspension was boiled for 15 minutes, after which the resin was precipitated at pH 5 by adding 10% strength hydrochloric acid, and then heated at the boil for a further 15 minutes. The formulation was filtered-off, washed with water and dried at from 50° to 60° C.

When the formulation was dispersed in a letterpress/offset printing varnish, the resulting ink possessed substantially higher transparency and color strength in comparison with a pigment prepared in a similar manner without the addition of a dye but otherwise having the same composition.

EXAMPLE 21

1. Tetrazotization 14 parts of 3,3'-dichloro-4,4'-diaminodiphenyl in 835 parts of 0.4N hydrochloric acid were tetrazotized at 0° C. with 7.7 parts of sodium nitrite. Excess sodium nitrite was removed with amidosulfonic acid.

2. Coupling 19.9 parts of 1-phenyl-3-methylpyrazol-5-one were dissolved in 130 parts of 2N sodium hydroxide solution. 143 parts of 2N acetic acid were initially taken in the coupling vessel. The coupling component was precipitated by adding the alkaline solution dropwise to the acetic acid. Thereafter, the tetrazo solution 1 was added, the temperature being kept at 20° C. When coupling was complete, 1.8 parts of the dye stated in Example 8, in the form of an aqueous solution, were added to the suspension. Thereafter, the mixture was boiled for 30 minutes, and the formulation was then filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss to those found in the case of the formulation obtained as described in Example 1(A).

EXAMPLES 22 TO 28

14 parts of tetrazotized 3,3'-dichloro-4,4'-diaminodiphenyl were coupled to 21.6 parts of 1-p-tolyl-3-methylpyrazol-5-one similarly to Example 21. The resulting pigment suspension was after-treated in each case as described below.

EXAMPLE 22

1.9 parts of the dye of EP-A-34 725, Example 71, in the form of an aqueous suspension, were added, and heating and workingup were carried out as described in Example 1(A2).

EXAMPLE 23

1.9 parts of the dye stated in Example 3, in the form of an aqueous solution, were added, and the procedure described in Example 3 was then followed.

EXAMPLE 24

1.9 parts of the dye stated in Example 3, in the form of an aqueous solution, were added, followed by 6.35 parts of partially hydrogenated rosin dissolved in 78 parts of 0.3N sodium hydroxide solution. The heat treatment and working up were carried out similarly to Example 16.

EXAMPLE 25

1.9 parts of the dye stated in Example 3, in the form of an aqueous solution, 6.68 parts of partially hydrogenated rosin in 81 parts of 0.3N sodium hydroxide solution and a dispersion of 1.78 parts of dibutyl sebacate in 10 parts by volume of water were added. The heat treatment and working up were carried out as described in Example 16.

EXAMPLE 26

1.9 parts of the dye stated in Example 2, in the form of an aqueous suspension, 6.68 parts of partially hydrogenated rosin (Staybelite Resin), dissolved in 82 parts of 0.3N sodium hydroxide solution, and a dispersion of 1.78 parts of dibutyl sebacate in 10 parts of water were added. The heat treatment and working up were carried out as described in Example 16.

EXAMPLE 27

1.9 parts of the dye stated in Example 1(A2), in the form of an aqueous suspension, 6.68 parts of partially hydrogenated rosin, dissolved in 82 parts of 0.3N sodium hydroxide solution, and a dispersion of 1.78 parts of dibutyl sebacate in 10 parts of water were added. The heat treatment and working up were carried out as described in Example 16.

EXAMPLE 28

1.9 parts of the dye stated in Example 8, in the form of an aqueous solution, 6.68 parts of partially hydrogenated rosin, dissolved in 82 parts of 0.3N sodium hydroxide solution, and a dispersion of 1.78 parts of dibutyl sebacate in 10 parts of water were added. Working up was carried out as described in Example 16.

When used in a nitrocellulose gravure printing ink, the formulation obtained as described in Example 22 to 28 possessed similar advantages, particularly in respect of rheological behavior and gloss, to those found in the case of the formulation obtained as described in Example 1(A).

EXAMPLE 29

1. Diazotization 14 parts of 2-amino-5-nitroanisole in 500 parts of 0.5N hydrochloric acid were diazotized at 0° C. with 5.91 parts of sodium nitrite.

2. Coupling 18.11 parts of acetoacet-2-methoxyanilide were dissolved in 130 parts of 1.5N sodium hydroxide solution. 58 parts of 1N acetic acid were intially taken in the coupling vessel, and the coupling component in alkaline solution was added in an amount such that the pH was 4.5. Thereafter, the diazo solution 1 and the remaining solution of the coupling component were introduced simultaneously into the reaction vessel. During this procedure, the pH was kept at 4.5 and the temperature at 10° C., if necessary by adding dilute sodium hydroxide solution. When coupling was complete, 1.7 parts of the dye stated in Example 1, in the form of an aqueous suspension, and 5.68 parts of a partially hydrogenated rosin (Staybelite Resin) in 71 parts of 0.3N sodium hydroxide solution were added in succession to the pigment suspension. The suspension was boiled for 30 minutes, and the formulation was filtered-off, washed with water and dried at from 50° to 60° C.

The formulation was dispersed in a nitrocellulose gravure printing binder, as descibed in Example 1(C1). Comparison with a pigment prepared without the addition of a dye indicated similar advantages in terms of gloss, transparency and rheological behavior to those found in the case of the formulation obtained as described in Example 1(A).

EXAMPLE 30

The synthesis and after-treatment of the pigment 2-amino-5-nitroanisole→acetoacet-2-methoxyanilide were carried out as described in Example 29, except that, instead of the dye stated there, 1.7 parts of the dye indicated in Example 2, in the form of an aqueous suspension, were added.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 31

The synthesis and after-treatment of the pigment 2-amino-5-nitroanisole→acetoacet-2-methoxyanilide were carried out as described in Example 29, except that, instead of the dye stated there, 1.7 parts of the dye indicated in Example 3, in the form of an aqueous solution, were added.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 32

The synthesis of the pigment 2-amino-5-nitroanisole→acetoacet-2-methoxyanilide was carried out as described in Example 29. When coupling was complete, 1.7 parts of the dye stated in Example 1, in the form of an aqueous suspension, 5.96 parts of a partially hydrogenated rosin (Staybelite Resin) in 75 parts of 0.3N sodium hydroxide solution and a dispersion of 59 parts of dibutyl sebacate in 10 parts of water were added in succession to the pigment suspension. Thereafter, the mixture was boiled for 30 minutes, and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 33

The synthesis and after-treatment of the pigment 2-amino-5-nitro-anisole→acetoacet-2-methoxyanilide were carried out as described in Example 32, except that, instead of the dye stated there, 1.7 parts of the dye indicated in Examle 2, in the form of an aqueous suspension, were added.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 34

The synthesis and after-treatment of the pigment 2-amino-5-nitroanisole→acetoacet-2-methoxyanilide were carried out as described in Example 32, except that, instead of the dye stated there, 1.7 parts of the dye indicated in Example 3, in the form of an aqueous solution, were added.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 35

1. Diazotization 15.98 parts of 3-nitro-4-aminotoluene in 405 parts of 0.7N hydrochloric acid were diazotized at 0° C. with 7.29 parts of sodium nitrite.

2. Coupling 282 parts of 1N acetic acid were initially taken in the coupling vessel, and a solution of 19.08 parts of acetoacetanilide in 68 parts by volume of 4N sodium hydroxide solution were added, while stirring. The diazo solution 1 was then added to the coupling component in the course of 2 hours at from 15° to 20° C. When coupling was complete, 1.88 parts of the dye stated in Example 1, in the form of an aqueous suspension, and 6.31 parts of a partially hydrogenated rosin (Staybelite Resin) in 79 parts of 0.3N sodium hydroxide solution were added in succession to the pigment suspension. Thereafter, the mixture was heated at 60° C. for 30 minutes, and the end product was then filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 36

Diazotization of 15.98 parts of 3-nitro-4-aminotoluene and coupling of the product of 19.08 parts of acetoacetanilide were carried out as described in Example 35. When coupling was complete, the pigment suspension was neutralized with 10% strength sodium hydroxide solution. Thereafter, 1.88 parts of the dye stated in Example 3, in the form of an aqueous solution, 6.62 parts of a partially hydrogenated rosin (Staybelite resin) dissolved in 82 parts of 0.3N sodium hydroxide solution and a dispersion of 1.77 parts of dibutyl sebacate in 10 parts of water were added in succession. The pigment suspension was then heated at 60° C. for 60 minutes, after which the resin was precipitated at pH 5 by adding 10% strength hydrochloric acid, and stirring was continued for a further 15 minutes at 60° C. The formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 37

1. Diazotization 11.5 parts of 4-chloro-2-nitroaniline in 405 parts of 0.5N hydrochloric acid were diazotized at 0° C. with 4.73 parts of sodium nitrite.

2. Coupling 14.5 parts of acetoacet-2-methoxyanilide were dissolved in 104 parts of 1.5N sodium hydroxide solution. 46.5 parts of 1N acetic acid were initially taken in the coupling vessel, and the alkaline solution of the coupling component was added in an amount such that a pH of 4.5 was reached. Thereafter, the diazo solution 1 and the remaining solution of the coupling component were allowed to run simultaneously into the reaction vessel, the pH being kept at 4.5 (if necessary with the addition of dilute sodium hydroxide solution) and the temperature at 20° C. When coupling was complete, 1.4 parts of the dye stated in Example 1, in the form of an aqueous suspension, were added to the pigment suspension, after which the suspension was boiled for 30 minutes and the formulation was filtered-off, washed with water and dried at from 50° to 60° C.

The formulation was dispersed in a nitrocellulose gravure printing binder, as described in Example 1(C1). Comparison with a pigment prepared without the addition of a dye indicated similar advantages in terms of gloss, transparency and rheological behavior to those found in the case of the formulation obtained as described in Example 1(A).

EXAMPLE 38

Diazotization of 11.5 parts of 4-chloro-2-nitroaniline and coupling of the product to 14.5 parts of acetoacet-2,4-methoxyanilide were carried out as described in Example 37, except that 1.4 parts of the dye stated in Example 2, in the form of an aqueous suspension, were added to the pigment suspension. Thereafter, the suspension was boiled for 30 minutes, and the product was filtered-off, washed with water and dried at from 50° to 60° C.

The formulation was dispersed in a nitrocellulose gravure printing binder, as described in Example 1 (C1). Comparison with a pigment prepared without the addition of a dye indicated similar advantages in terms of rheological behavior to those found in the case of the novel formulation obtained as described in Example 1(A). Advantages in terms of gloss and transparency were also found.

EXAMPLE 39

1.2 parts of the dye stated in Example 8, in the form of an aqueous solution, were added to an aqueous pigment suspension obtained by diazotizing 12.3 parts of 3-nitro-4-aminotoluene and coupling the diazo compound to 11.3 parts of β-naphthol in a conventional manner. The mixture was then heated at 60° C. for 30 minutes, and the product was filtered-off, washed with water, and dried.

The formulation was dispersed in a nitrocellulose gravure printing binder, as described in Example 1 (C1). Compared with a gravure printing ink prepared using a comparison pigment (which was after-treated in the absence of a dye), the printing ink prepared using the novel pigment formulation gave prints possessing higher gloss and improved transparency.

EXAMPLE 40

Tetrazotization of 14 parts of 3,3,'-dichloro-4,4'-diaminodiphenyl and coupling of the product to 23.2 parts of acetoacet-2,4-dimethylanilide were carried out as stated in Example 1. When coupling was complete, the pH of the pigment suspension was brought to 9 with 10% strength sodium hydroxide solution. Thereafter, 0.8 part of the dye used in Example 3, in the form of an aqueous solution, was added, followed by a solution of 17.2 parts of balsam resin in 210 parts of 0.3N sodium hydroxide solution and a dispersion of 2.3 parts of dibutyl sebacate in 10 parts of water. The pigment suspension was heated at the boil for 15 minutes, after which the resin was precipitated at pH 5 by adding 10% strength hydrochloric acid, and heated at the boil for a further 15 minutes. The formulation was filtered-off, washed with water and dried at from 50° to 60° C.

The formulation was dispersed in a nitrocellulose gravure printing binder, as described in Example 1 (C1). In terms of gloss, transparency and flow behavior, the ink obtained possessed substantial advantages over an ink containing the comparison pigment prepared without dye (b).

EXAMPLE 41

The synthesis of the pigment 3,3'-dichloro-4,4'-diaminodiphenyl→acetoacet-2,4-dimethylanilide/acetoacet-2-methoxyanilide was carried out as described in Example 17.

When coupling was complete, the pH of the pigment suspension was brought to 9 with 10% strength sodium hydroxide solution. Thereafter, 0.8 part of the dye used in Example 3, in the form of an aqueous solution, was added, followed by a solution of 17.2 parts of balsam resin in 210 parts of 0.3N sodium hydroxide solution and a dispersion of 2.3 parts of dibutyl sebacate in 10 parts of water. The pigment suspension was heated at the boil for 15 minutes, after which the resin was precipitated at pH 5 by adding 10% strength hydrochloric acid, and heated at the boil for a further 15 minutes. The formulation was filtered-off, washed with water and dried at from 50° to 60° C.

The formulation was dispersed in a nitrocellulose gravure printing binder, as described in Example 1 (C1). The formulation possessed tinctorial and rheological properties similar to those of the formulation obtained according to Example 41, but had a somewhat higher color strength and a more greenish hue.

We claim:

1. A pigment, formlation containing (a) one or more azo pigments (α) based on coupling products of diazotized aromatic monoamines with acetoacetarylides, 1-phenylpyrazolones, 3-hydroxy-2-naphthoic acid, its arylides and/or β-naphthol, or (β) based on coupling products of tetrazotized 4,4'-diaminodiphenyl, dichloro-, dichlorodibromo- and/or tetrachloro-4,4'-diaminodiphenyl with acetoacetarylides and/or 1-phenylpyrazolones, or (γ) mixtures of (α) and (β), and (b) one or more dyes of the general formula $$Q-(X)_n$$

where Q is an n-valent radical of a monoazo dye, a disazo dye or a quinophthalone, and may or may not carry a sulfo group, n is 1, 2, 3 or 4 and X is a group of the formula

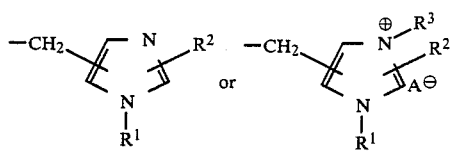

where $R^1$ and $R^2$ independently of one another are each hydrogen or $C_1$-$C_4$-alkyl, $R^3$ is $C_1$-$C_4$-alkyl or hydroxy-$C_2$-$C_4$-alkyl and $A^\ominus$ is one equivalent of an anion, and, where n is >1, the radicals X may be identical or different.

2. A pigment formulation as claimed in claim 1, which contains, as (a), one or more disazo pigments based on diazotized 3,3'-dichloro-4,4'-diaminodiphenyl and an acetoacetarylide, a 1-phenylpyrazol-5-one compound or a mixture of these.

3. A pigment formulation as claimed in claim 1, which contains, as (b), one or more dyes of the formula:

$$Q-(X)_{n'}$$

where Q is an n'-valent radical of benzoquinophthalone, which is unsubstituted or carries a sulfo group, or of a coupling product of a 4,4'-diaminophenyl with an acetoacetanilide, a phenylpyrazolone, a naphthol or a 3-hydroxy-2-naphthoic acid arylide, or is a radical of a dye of the formula:

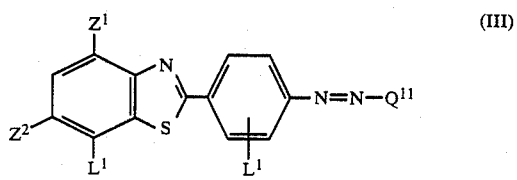

or

-continued

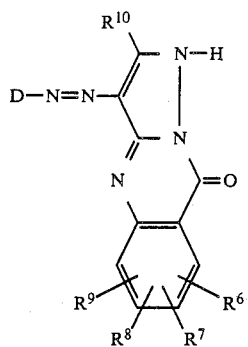
(IV)

n' is 1 or 2, $Q^{11}$ is a radical of the formula:

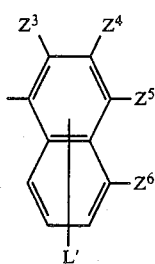
(Va)

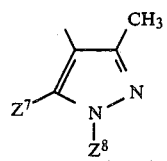
(Vb)

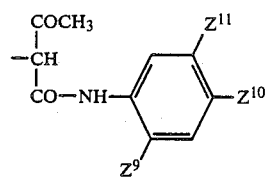
(Vc)

(Vd)

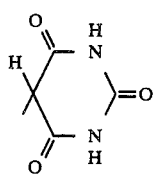
(Ve)

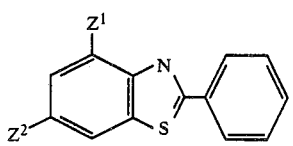
(Vf)

D is phenyl or is phenylazo-substituted or tolylazo-substituted phenyl which may be further substituted by one or two chlorine atoms, nitro groups, methoxy groups or methyl groups, or is a radical of 2-(4'-phenylene)-benzothiazole, which is unsubstituted or substituted in the 4-position by methyl or in the 6-position by methyl or ethyl, $Z^1$ is hydrogen or methyl, $Z^2$ is hydrogen, methyl or ethyl, L' is sulfo or hydrogen, $Z^3$ is hydrogen, hydroxyl, amino, 2-hydroxyethylamino, methylamino, or phenylamino, $Z^4$ is hydrogen, acetyl or N-phenylcarbamyl, $Z^5$ is hydrogen, hydroxyl, methyl, methoxy, chlorine, bromine, 2-hydroxyethylamino or dimethylamino, $Z^3$ or $Z^5$ being hydroxyl, amino or substituted amino, $Z^6$ is hydrogen, methyl or methoxy, $Z^7$ is hydroxyl or amino, $Z^8$ is phenyl or 4-methoxyphenyl, $Z^9$ and $Z^{10}$ are each hydrogen, methyl or methoxy, $Z^{11}$ is hydrogen or methoxy, $Z^{12}$ is methoxy, butoxy, amino, methylamino, phenoxy, 4-methylphenoxy or 3-methyl-4-methoxyphenoxy, $R^6$ is hydrogen, chlorine, bromine, nitro, methyl, trifluoromethyl, carboalkoxy, carbamyl, substituted carbamyl, sulfamyl, substituted sulfamyl, a sulfonic acid aryl ester group, cyano, alkanoylamino or phenyl, $R^7$ is hydrogen, chlorine or bromine, $R^8$ and $R^9$ independently of one another are each hydrogen, chlorine or bromine, or together form a fused ring, $R^{10}$ is methyl, phenyl or chlorine-substituted or methoxy-substituted phenyl and X has the meanings stated in claim 1.

4. A pigment formulation as claimed in claim 3, which contains, as (b), one or more dyes of the formula $$Q-(X)_{n'}$$ 

where Q is an n'-valent radical which is derived from 5,6-benzoquinophthalone, from a dye which contains 3,3'-dichloro-4,4'-diaminodiphenyl, dichlorodibromo-4,4'-diaminodiphenyl or tetrachloro-4,4'-diaminodiphenyl as a tetrazo component and an acetoacetanilide, a phenylpyrazolone or a mixture of these as the coupling component, or from a dye of the formula

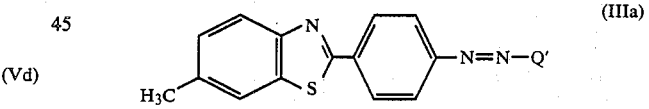
(IIIa)

or

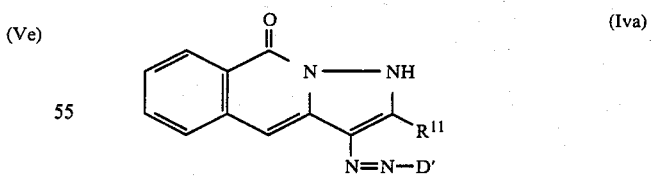
(Iva)

where Q' is a radical of barbituric acid, of N-methyl-N-benzylaniline or of 4-(6'-methylbenzothiazol-2'-yl)-phenyl, $R^{11}$ is methyl or phenyl and D' is a radical of phenyl which is substituted by phenylazo or tolylazo and may be further substituted by chlorine, methoxy or methyl, or of 4-(6'-methylbenzothiazol-2'-yl)-phenyl, and n' is 1 or 2.

5. A pigment formulation as claimed in claim 1, wherein (b) is a dye of the formula

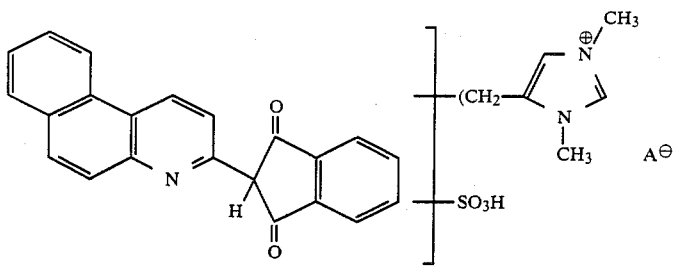

where A⊖ is one equivalent of an anion.

6. A pigment formulation as claimed in claim 1, which contains from 0.2 to 10% by weight, based on (a), of (b).

7. A pigment formulation as claimed in claim 3, which contains from 0.2 to 10% by weight, based on (a), of (b).

8. A pigment formulation as claimed in claim 4, which contains from 0.2 to 10% by weight, based on (a), of (b).

9. A pigment formulation as claimed in claim 5, which contains from 0.2 to 10% by weight, based on (a), of (b).

10. A pigment formulation containing
(a) one or more disazo pigments based on diazotized 3,3′-dichloro-4,4′-diminodiphenyl and an acetoacetarylide, a 1-phenylpyrazol-5-one compound or a mixture of these compounds, and
(b) from 0.2 to 10% by weight, based on (a), of one or more dyes of the formula $$Q-(X)_{n'}$$

where Q is an n′-valent radical of benzoquinophthalone, which is unsubstituted or carries a sulfo group, of a coupling product of a 4,4′-diaminodiphenyl with an acetoacetanilide, a phenylpyrazolone, a naphthol or a 3-hydroxy-2-naphthoic acid arylide, or is a radical of a dye of the formula

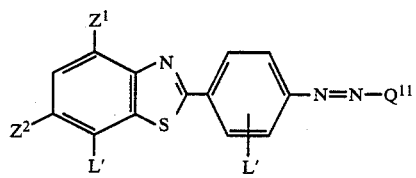

(III)

or

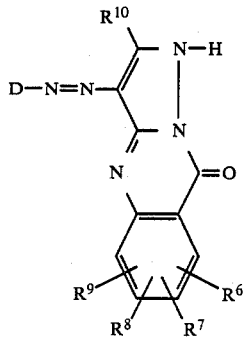

(IV)

n′ is 1 or 2, $Q^{11}$ is a radical of the formula

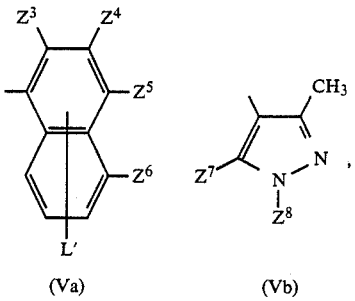

(Va)    (Vb)

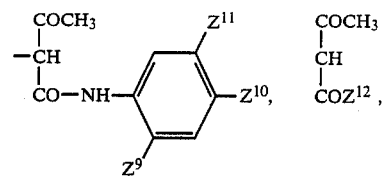

(Vc)    (Vd)

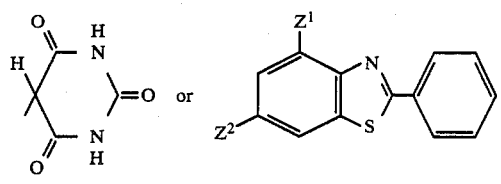

(Ve)    (Vf)

D is phenyl or phenylazo-substituted or tolylazo-substituted phenyl which may be further substituted by one or two chlorine atoms, nitro groups, methoxy groups or methyl groups, or is a radical of 2-(4′-phenylene)-benzothiazole, which is unsubstituted or substituted in the 4-position by methyl or in the 6-position by methyl or ethyl, $Z^1$ is hydrogen or methyl, $Z^2$ is hydrogen, methyl or ethyl, L′ is sulfo or hydrogen, $Z^3$ is hydrogen, hydroxyl, amino, 2-hydroxyethylamino, methylamino, or phenylamino, $Z^4$ is hydrogen, acetyl or N-phenylcarbamyl, $Z^5$ is hydrogen, hydroxyl, methyl, methoxy, chlorine, bromine, 2-hydroxyethylamino or dimethylamino, $Z^3$ or $Z^5$ being hydroxyl, amino or substituted amino, $Z^6$ is hydrogen, methyl or methoxy, $Z^7$ is hydroxyl or amino, $Z^8$ is phenyl or 4-methoxyphenyl, $Z^9$ and $Z^{10}$ are each hydrogen, methyl or methoxy, $Z^{11}$ is hydrogen or methoxy, $Z^{12}$ is methoxy, butoxy, amino, methylamino, phenoxy, 4-methylphenoxy or 3-methyl-4-methoxyphenoxy, $R^6$ is hydrogen, chlorine, bromine, nitro, methyl, trifluoromethyl, carboalkoxy, carbamyl, substituted carbamyl, sulfamyl, substituted sulfamyl, a sulfonic acid aryl ester group, cyano, alkanoylamino or phenyl, $R^7$ is hydrogen, chlorine or bromine, $R^8$ and $R^9$ independently of one another are each hydrogen, chlorine or bromine, or together form a fused ring, $R^{10}$ is methyl, phenyl or chlorine-substituted or methoxy-substituted phenyl, and X is a group of the formula

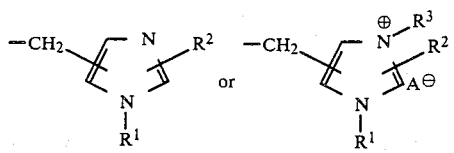

where $R^1$ and $R^2$ independently of one another are each hydrogen or $C_1$–$C_4$-alkyl, $R^3$ is $C_1$–$C_4$-alkyl or hydroxy-$C_2$–$C_4$-alkyl and $A^-$ is one equivalent of an anion, and, where $n > 1$, the radicals X may be identical or different.

11. A pigment formulation as claimed in claim 10, which contains, as (b), one or more dyes of the formula $$Q{-}(X)_{n'}$$

where Q is an n'-valent radical which is derived from 5,6-benzoquinophthalone, from a dye which contains 3,3'-dichloro-4,4'-diaminodiphenyl, dichlorodibromo-4,4'-diaminodiphenyl or tetrachloro-4,4'-diaminodiphenyl as a tetrazo component and an acetoacetanilide, a phenylpyrazolone or a mixture of these as the coupling component, or from a dye of the formula

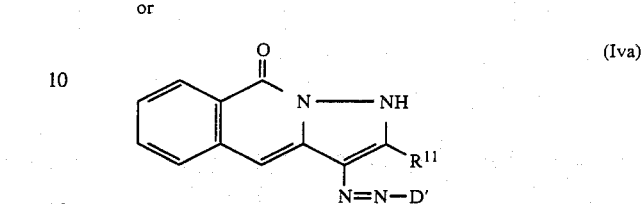

where Q' is a radical of barbituric acid, of N-methyl-N-benzylaniline or of 4-(6'-methylbenzothiazol-2'-yl)-phenyl, $R^{11}$ is methyl or phenyl and D' is a radical of phenyl which is substituted by phenylazo or tolylazo and may be further substituted by chlorine, methoxy or methyl, or of 4-(6'-methylbenzothiazol-2'-yl)-phenyl, and n' is 1 or 2.

12. A pigment formulation as claimed in claim 10, wherein (b) is a dye of the formula

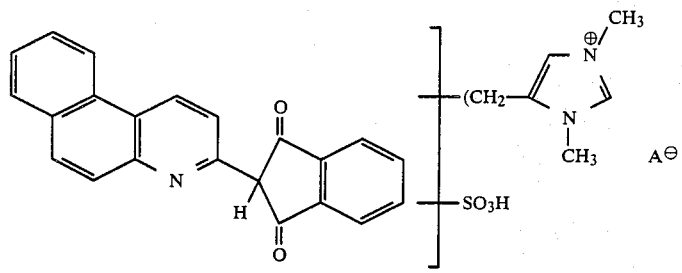

where $A^\ominus$ is one equivalent of an anion.

13. A pigment formulation as claimed in claim 11, wherein (b) is a dye of the formula

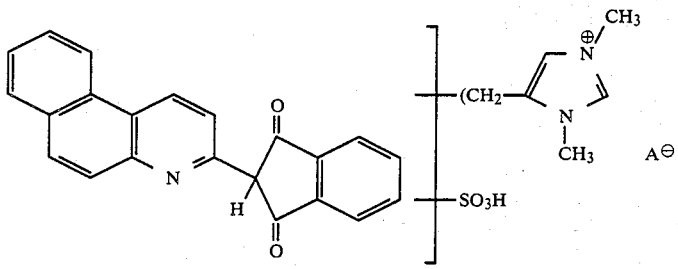

where $A^\ominus$ is one equivalent of an anion.

14. A pigment formulation as claimed in claim 10, which contains from 1 to 5% by weight, based on (a), of (b).

15. A pigment formulation as claimed in claim 11, which contains from 1 to 5% by weight, based on (a), of (b).

16. A pigment formulation as claimed in claim 12, which contains from 1 to 5% by weight, based on (a), of (b).

17. A pigment formulation as claimed in claim 13, which contains from 1 to 5% by weight, based on (a), of (b).

* * * * *